(12) United States Patent
Nguyen

(10) Patent No.: US 6,356,404 B1
(45) Date of Patent: Mar. 12, 2002

(54) SIMULTANEOUSLY BIASING MULTIPLE MAGNETO-RESISTIVE READ ELEMENTS

(75) Inventor: Hieu V. Nguyen, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/326,092

(22) Filed: Jun. 4, 1999

Related U.S. Application Data
(60) Provisional application No. 60/088,064, filed on Jun. 5, 1998.

(51) Int. Cl.[7] .............................. G11B 5/03; G11B 5/09; G11B 15/12
(52) U.S. Cl. ............................. 360/66; 360/46; 360/63
(58) Field of Search ............................. 360/53, 63, 64, 360/66, 67, 46

(56) References Cited

U.S. PATENT DOCUMENTS

| | | | |
|---|---|---|---|
| 4,807,204 A | * | 2/1989 | Mizutani et al. ............ 360/114 |
| 4,833,559 A | | 5/1989 | Belk |
| 4,912,576 A | | 3/1990 | Janz |
| 5,262,907 A | | 11/1993 | Duffy et al. |
| 5,309,295 A | | 5/1994 | Bailey et al. |
| 5,315,372 A | | 5/1994 | Tsai |
| 5,373,402 A | | 12/1994 | Price, Jr. et al. |
| 5,412,518 A | | 5/1995 | Christner et al. |
| 5,541,784 A | | 7/1996 | Cribbs et al. |
| 5,610,777 A | | 3/1997 | Dang et al. |
| 5,615,063 A | | 3/1997 | Kuroki et al. |
| 5,774,295 A | | 6/1998 | Tsai |
| 5,790,331 A | | 8/1998 | Aranovsky |
| 5,877,911 A | * | 3/1999 | Klaassen et al. ............... 360/67 |
| 5,880,912 A | | 3/1999 | Rottmayer |
| 5,898,534 A | * | 4/1999 | Gray ........................ 360/77.01 |
| 6,104,562 A | * | 8/2000 | Ottesen et al. ................ 360/63 |
| 6,141,165 A | * | 10/2000 | Nguyen et al. ............... 360/63 |

* cited by examiner

Primary Examiner—Regina Y. Neal
(74) Attorney, Agent, or Firm—Crowe & Dunlevy (57) ABSTRACT

Apparatus and method for simultaneously biasing multiple magneto-resistive read elements in a disc drive head/disc assembly. A preamplifier circuit sequentially applies read bias currents to successive pairs of heads of the head/disc assembly, wherein the read bias current applied to a selected one of each pair of the heads is used to transduce the servo data from the associated disc recording surface, and the read bias current applied to the remaining one of each pair of the heads is used to prepare the remaining one of each pair of the heads to subsequently transduce the servo data from the associated disc recording surface. The preamplifier circuit includes at least first and second read bias current sources and a head selection circuit.

9 Claims, 8 Drawing Sheets

SIMULTANEOUSLY BIASING MULTIPLE MAGNETO-RESISTIVE READ ELEMENTS

RELATED APPLICATIONS

This application claims the benefit of U.S. Provisional Application No. 60/088,064, filed Jun. 5, 1998.

FIELD OF THE INVENTION

This invention relates generally to the field of disc drive storage devices, and more particularly, but not by way of limitation, to improving data transfer operations such as servo track write verification by biasing multiple magneto-resistive read elements of a disc drive.

BACKGROUND OF THE INVENTION

Hard disc drives are used in modern computer systems to enable users to store and retrieve vast amounts of data in a fast and efficient manner. A typical disc drive is generally composed of a head/disc assembly (HDA) which houses requisite mechanical portions of the drive and a printed wiring assembly (PWA) which supports requisite electronic portions of the drive.

The HDA includes a base deck to which various components are mounted and a top cover which cooperates with the base deck to form a sealed housing to reduce particulate contamination. Within the housing, a disc stack is formed from one or more magnetic recording discs which are axially aligned for rotation by a spindle motor at a constant, high speed, such as 10,000 revolutions per minute during normal disc drive operation.

A rotary actuator assembly is mounted adjacent the disc stack and includes a plurality of rigid arms which extend into the stack between adjacent discs, as well as above and below the top and bottom discs. The rigid arms support flexible suspension assemblies which in turn, support a corresponding number of read/write heads adjacent the surfaces of the discs. One head is provided for each disc surface to read data from and to write data to the corresponding surface.

Of particular interest are magneto-resistive (MR) heads, which utilize thin-film inductive write elements to write data and MR read elements to read previously written data. A typical MR read element is formed from an alloy of materials so as to have a baseline electrical resistance which varies in the presence of a magnetic field of a selected orientation. By passing a bias current through the MR element, the selective magnetization of a corresponding track can be determined in relation to variations in voltage detected across the MR element.

A preamplifier/driver circuit is typically mounted to the side of the actuator assembly and includes a write driver circuit to apply write currents to a selected write element during a write operation. The preamplifier/driver circuit further includes a bias current source which is sequentially connected to the appropriate read element to effect a read operation.

The electronics provided on the disc drive PWA primarily serve to control the operation of the HDA and to communicate with a host computer in which the disc drive is mounted. Generally, the top level functional blocks on the PWA include a read/write channel which controls the reading and writing of data from and to the discs, a spindle motor control circuit which controls the rotation of the spindle motor, and a servo control circuit which controls the position of the heads.

Aspects of a typical servo control circuit are discussed in U.S. Pat. No. 5,262,907 issued to Duffy et al., assigned to the assignee of the present invention. The servo control circuit positions the heads relative to the tracks through the application of current to a coil of a voice coil motor (VCM) within the HDA, the coil being mounted to the actuator opposite the heads. The tracks are defined from servo data written to servo data fields on the surfaces of the discs during the manufacturing of the HDA. The servo data are stored as a series of radially extending servo wedges on each of the disc surfaces, with the servo wedges composed of adjacently aligned servo data fields, with each servo data field in each wedge defining a unique track. Hence, by periodically transducing the servo data associated with a particular track, the servo control circuit can adjust the current applied to the coil to adjust the position of the corresponding head. User data fields, which are used to store user data from the host computer, are subsequently defined between adjacent servo fields during a disc drive formatting operation.

Conventionally, the servo data are written using a servo track writing system, also commonly referred to as a servo track writer (STW). A typical servo track writer comprises a fixture on which each HDA in turn is mounted. Once mounted, the servo track writer proceeds to write the servo data using the heads of the HDA. Thus, a typical servo track writer includes control circuitry which generally emulates portions of the electronics disposed on the PWA, as well as a closed loop positioning system which both detects the radial position of the heads and mechanically advances the heads. Access to the actuator is achieved by providing an opening in the base deck of the HDA which is later sealed.

Position detection and feedback are usually carried out using a laser inferometer or other precise optical displacement instrumentation. Mechanical advancement of the heads can be carried out by inserting a pusher pin assembly into the HDA to engage and move the actuator assembly. More recently, positioning systems have also been developed which apply current to the actuator coil, thereby utilizing the VCM to advance the position of the heads. The control and positioning systems are usually interfaced with a personal computer (PC) which provides a graphical user interface for the STW operator to control the operation of the system.

The writing of servo data is an important, but correspondingly time consuming, portion of the HDA manufacturing process. A typical STW operation can take up to several hours per HDA, so that disc drive manufacturers will often implement large numbers of STW stations to accommodate large scale disc drive production efforts. For purposes of efficiency, a servo track writer does not typically write all of the servo data on one disc surface before moving to the next surface; rather, each of the heads are selected in turn so that, after a selected head writes a portion of the data at a given radius, the next head is selected and used to write a corresponding portion of the servo data at a selected angular distance from the first portion, and so on. This results in the servo data on each disc surface being offset with respect to the data on adjacent surfaces, resembling steps of a spiral staircase. This is repeated multiple times around the circumference of the discs, as disc drives typically have from 30 to 90 servo wedges on each surface.

Once all of the servo data have been written at a given radius, the servo track writer proceeds to verify the accuracy of the writing operation. This generally entails sequentially applying a read bias current to each of the heads in turn to transduce and verify the servo data from the respective surfaces in the order in which the data were initially written to the surfaces. Because only one read bias current source is available in the preamplifier circuit, the elapsed time between successive servo data fields on successively read data surfaces must be long enough to allow the current to be switched from the first head to the second head and to allow the second head to reach an equilibrium state before the second servo data field is read. Hence, it may require a reduction in the rotational speed of the disc, or additional revolutions of the discs, in order to enable the servo track writer to verify all of the servo data. This can present a bottleneck in a disc drive manufacturing process, requiring additional investments in resources to meet the required process throughput.

Accordingly, there is a continued need for improvements in the manner in which data are tranduced from disc recording surfaces, such as during the read verification operations carried out during the writing of servo data. It is to such improvements that the present invention is directed.

SUMMARY OF THE INVENTION

The present invention is directed to an apparatus and method for providing improved read operations upon disc recording surfaces through the simultaneous biasing of multiple magneto-resistive read elements.

In accordance with preferred embodiments, a disc drive includes a head/disc assembly (HDA) housing a plurality of disc recording surfaces and an actuator assembly which supports a corresponding plurality of heads adjacent the surfaces. A preamplifier circuit is mounted to the actuator assembly and includes a first read bias current source which generates a first read bias current of selected magnitude. The preamplifier circuit further includes a second read bias current source which generates a second read bias current of selected magnitude independently of the first read bias current. A head selection circuit of the preamplifier circuit selects first and second heads of the HDA so that the first and second read bias currents are simultaneously directed to the first and second heads, respectively.

In this way, a read operation, such as a verification operation used to verify accuracy of servo data written to the disc recording surfaces during a servo track write operation, can be carried out efficiently by sequentially applying read bias currents to successive pairs of the heads. The read bias current applied to a selected one of each pair of the heads is used to transduce the data from the associated disc recording surface, while the read bias current applied to the remaining one of each pair of the heads is used to prepare the remaining one of each pair of the heads to subsequently transduce the data from the associated disc recording surface.

These and various other features as well as advantages which characterize the present invention will be apparent from a reading of the following detailed description and a review of the associated drawings.

BRIEF DESCRIPTION OF THE DRAWINGS

FIG. 8 provides a representation of a prior art preamplifier/driver circuit used to supply read bias currents to a plurality of MR heads.

FIG. 9 provides a representation of a preamplifier/driver circuit having multiple read bias current sources to simultaneously apply read bias currents to a plurality of MR heads in accordance with preferred embodiments of the present invention.

DETAILED DESCRIPTION

Figure 1:
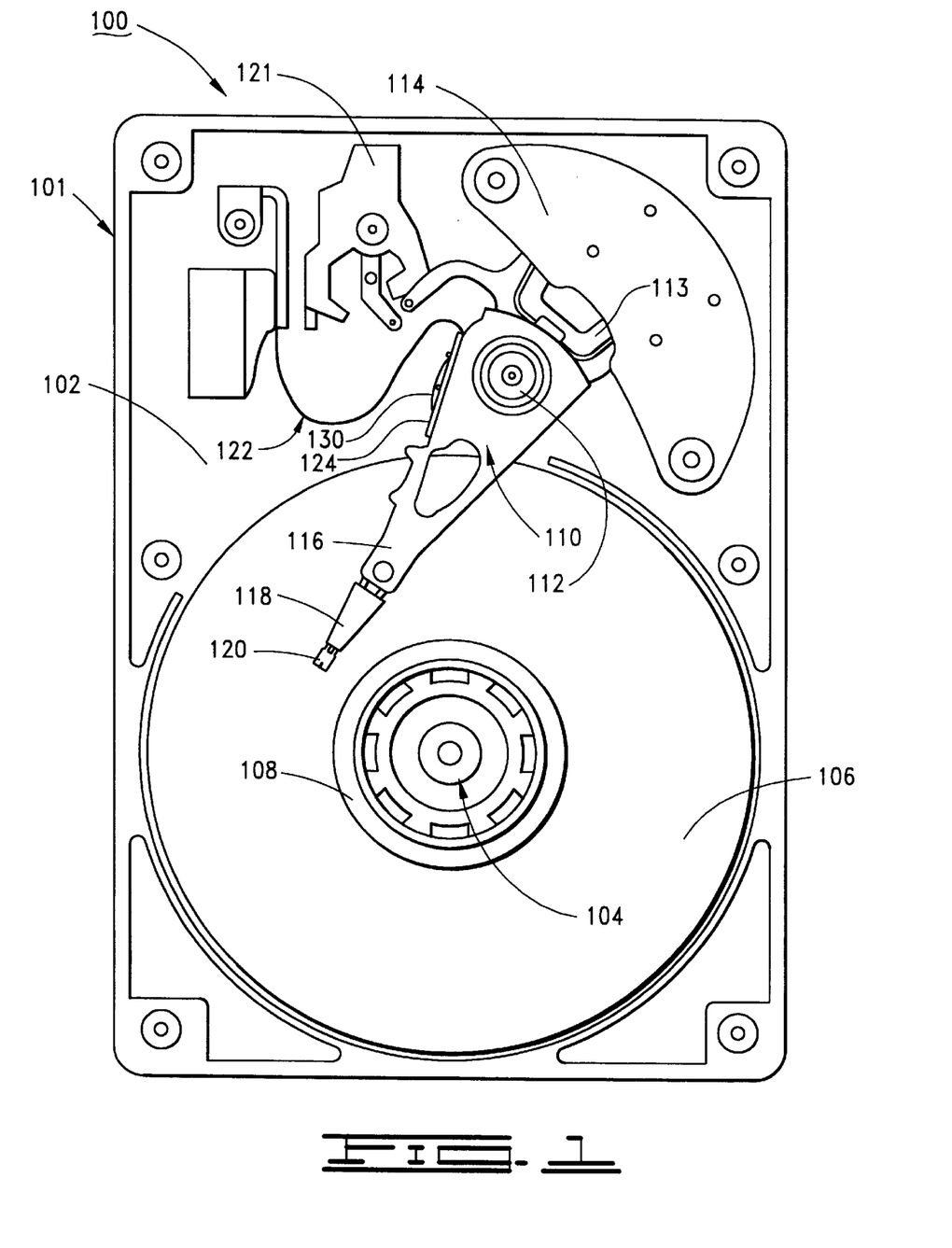
FIG. 1 is a top plan view of a head/disc assembly (HDA) of a disc drive constructed in accordance with preferred embodiments of the present invention, with the HDA combinable with a PWA to complete the disc drive.

Referring first to FIG. 1, shown therein is a top plan view of a disc drive 100, constructed and formatted in accordance with preferred embodiments of the present invention. The disc drive 100 is formed of two primary assemblies: a head/disc assembly (HDA) 101 which composes substantially all of the mechanical portions of the disc drive, and a printed wiring assembly (PWA) which supports electronics used to control the operation of the HDA. The PWA is mounted to the underside of the HDA 101 and is thus not visible in FIG. 1.

The HDA 101 includes a base deck 102 to which various disc drive components are mounted. A top cover, which has been omitted from FIG. 1 to facilitate the present discussion, cooperates with the base deck 101 to form a sealed housing for the HDA 101. A spindle motor 104 is provided to rotate a stack of discs 106 at a constant high speed during normal disc drive operation, with a disc clamp 108 securing the discs to the spindle motor 104.

To access the discs 106, a controllably positionable actuator assembly 110 (also referred to as an "E-block") is provided which rotates about a cartridge bearing assembly 112 in response to currents applied to a coil (a portion of which is shown at 113) of a voice coil motor (VCM) 114. The actuator assembly 1 10 includes a plurality of actuator arms from which corresponding flexure assemblies extend, the topmost of which are identified at 116 and 118 respectively. Heads 120 are provided at distal ends of the flexure assemblies 116, 118 and are supported over the discs 106 by air bearings established by air currents set up by the rotation of the discs 106. The heads 120 are positionably located over data tracks (not shown) of the discs 106 in order to read data from and write data to the tracks, respectively. As discussed more fully below, the heads 120 are characterized as magneto-resistive (MR) heads, with each head including a thin film inductive write element and a MR read element.

A latch assembly 121 secures the heads 120 over texturized landing zones (not shown) at the innermost diameters of the discs 106 when the HDA 101 is not in an operational mode (i.e., when the discs 106 are brought to rest). A flex circuit assembly 122 facilitates electrical communication between the actuator assembly 110 and the PWA. The flex circuit assembly 122 includes a flex circuit board 124 which supports an encapsulated preamplifier/driver circuit 130 which applies read and write currents to the heads 120. Preferred construction and operation of the preamplifier/driver circuit 130, also referred to herein as the "preamplifier circuit" and the "preamp," will be discussed in greater detail below.

Figure 2:
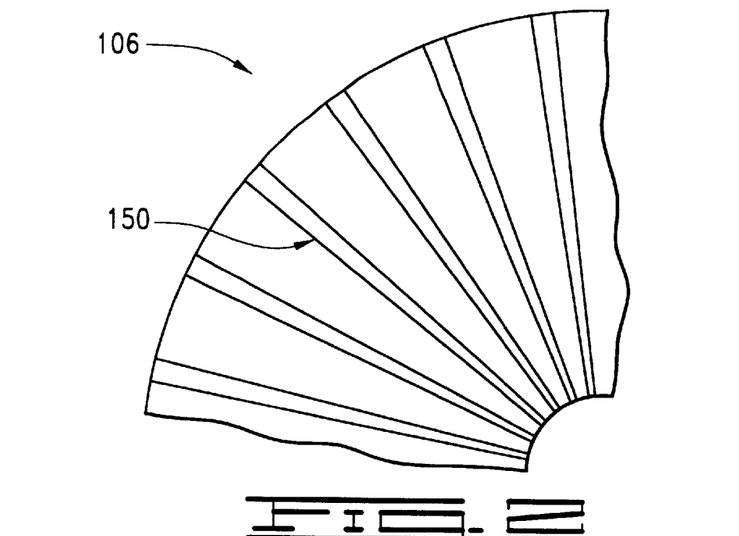
FIG. 2 illustrates the manner in which servo data are arranged on each of the disc surfaces in a plurality of radially extending wedges, each wedge comprising a plurality of adjacently disposed servo data blocks.

FIG. 2 provides a generalized representation of a preferred manner in which servo data are arranged onto the surfaces of the discs 106. Particularly, a number of servo wedges (one denoted at 150) radially extend from innermost to outermost radii of recording surface portions of the discs 106. Each of the servo wedges comprises a plurality of adjacently positioned and aligned servo data fields, as shown at 152 in FIG. 3.

Figure 3:
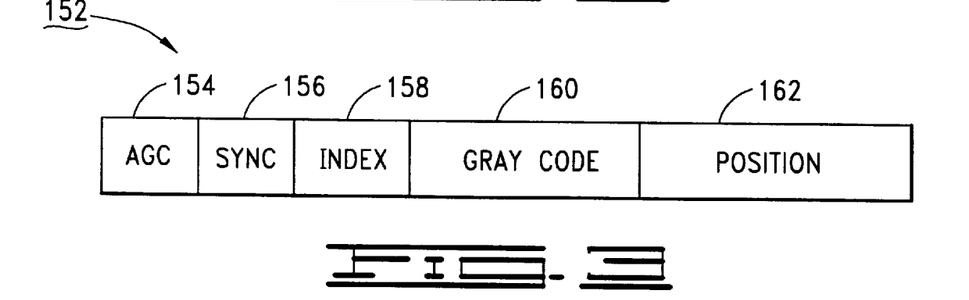
FIG. 3 shows a preferred configuration of one of the servo data blocks.

The servo data field 152 includes an automatic gain control (AGC) field 154 which stores an oscillating pattern (such as a 2T pattern) to prepare servo control circuitry (not shown) of the disc drive for receipt of remaining portions of the servo field 152. A synchronization (sync) field 156 provides timing information to the servo control circuitry. Index and Gray code fields 158, 160 respectively, indicate the angular and radial position of the servo field 152. A position field 162 provides inter-track positioning information and serves to define track boundaries on the disc surface.

Figure 4:
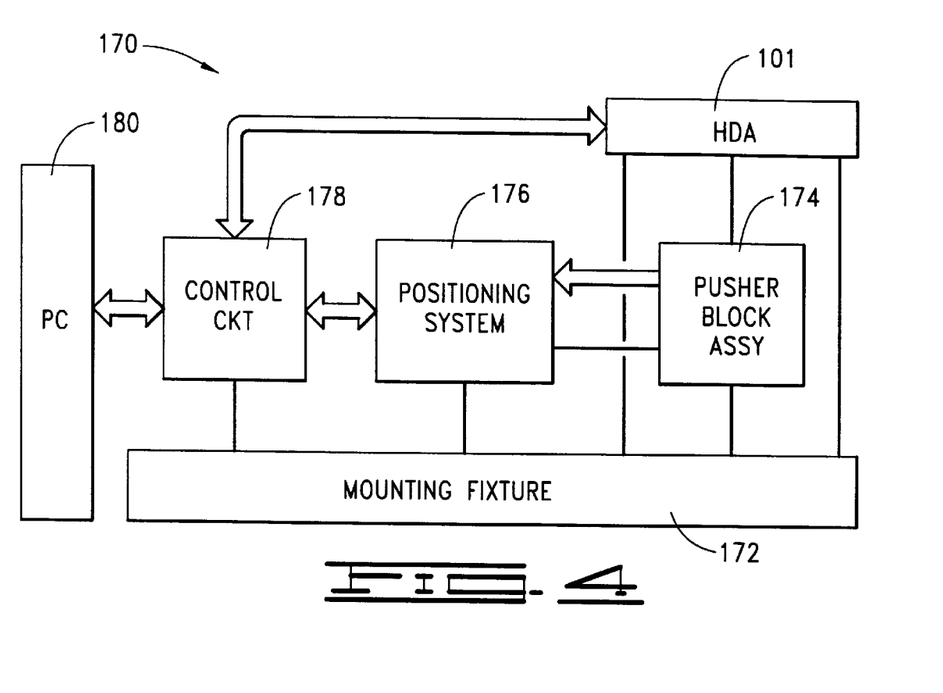
FIG. 4 provides a functional block diagram for a servo track writer used to write the servo data to the discs of the HDA in accordance with preferred embodiments.

The servo data are written to the discs 106 during manufacturing of the HDA 101 using a servo track writer (STW) 170, such as generally represented in FIG. 4. The HDA 101 is mounted over a mounting fixture 172 which serves as a mechanical reference for the servo track writer 170. The mounting fixture 172 typically comprises a granite block having a calibrated, level top surface on which a mounting plate is placed. The mounting plate includes clamps which locate and secure the HDA 101 to the mounting fixture 172. As such mounting fixtures 172 are well known, additional discussion will not be provided herein except to state that the HDA 101 is mounted in such a manner so as to provide access to the actuator assembly 110 (shown in FIG. 1) by the STW 170 during a servo write operation.

Continuing with FIG. 4, a pusher block assembly 174 is mounted to the mounting fixture 172 underneath the HDA 101 so as to engage the actuator assembly 110 in order to selectively position the actuator assembly 110 relative to the discs 106. Typically, an opening (not shown) is provided in the bottom of the base deck 102 of the HDA 101 so that the pusher block assembly 174 can access the internal environment of the HDA 101 by extending up through the opening in the base deck 102. Once the servo data have been written, the opening is typically covered by an adhesive label or other means to seal the internal environment of the HDA 101.

The STW 170 further comprises a positioning system 176 mounted to the mounting fixture 172 relative to the HDA 101. The positioning system 176 rotates the pusher block assembly 174 about a central axis in order to advance the position of the actuator assembly 110. The position of the pusher block assembly 174 is controlled by the positioning system 176 through a detection system (not separately designated) which detects the position of the pusher block assembly 174 and provides correction signals to a motor (also not separately designated) in order to rotate the pusher block assembly 174 accordingly.

A control circuit 178 emulates portions of the disc drive PWA in order to control the operation of the HDA 101, including the transfer of servo data to the HDA 101 from a personal computer (PC) 180. The PC 180 provides a graphical user interface for a user to control the STW operation.

During operation of the STW 170, the user mounts the HDA 101 to the mounting fixture 172 and instructs the STW 170 (by way of the PC 180) to commence writing the servo data to the discs 106. The control circuit 178 instructs the HDA 101 to commence rotation of the discs 106 by way of the spindle motor 104(FIG. 1) and instructs the pusher block assembly 174 to place the actuator assembly 174 at a starting position, such as near the outer radii of the discs 106. The STW 101 thereafter instructs the HDA 101 to write the servo data to each of the surfaces of the discs 106, while mechanically advancing the pusher block assembly 174 so as to define each new successive track on the discs 106. Each of the heads 120 in turn write the servo data to the corresponding discs 106 at each incrementally selected disc radius.

The time required to complete the writing of the servo data to a typical HDA depends upon the amount of servo data to be written to the discs, the rotational speed of the discs, the number of individual disc surfaces, and the time required to validate, or verify, that the servo data were written correctly. For reference, it can take several hours to complete the STW operation for a single high capacity HDA. Hence, there are substantial economic benefits to not only writing the data correctly the first time (to avoid the time and expense of rewriting the data), but also to carrying out all aspects of the STW operation as efficiently as possible.

Figure 5:
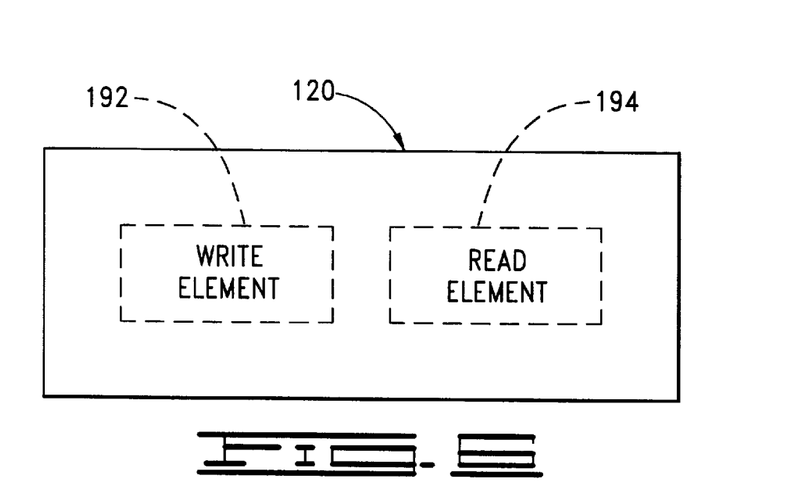
FIG. 5 provides a functional block diagram of a servo control circuit used to effect head positional control by the disc drive, with the circuitry being disposed on the disc drive PWA and at least portions of which preferably emulated by the servo track writer.

Before turning to a discussion of preferred methodologies by which the STW 170 of FIG. 4 advantageously carries out readback verification functions of the written servo data, reference is made to FIG. 5, which provides a functional block diagram of a servo circuit 182 used to effect head positional control for each of the heads 120 with respect to the corresponding disc surfaces. It will be recognized that most of the servo circuit 182 is disposed on the aforementioned disc drive PWA and used during normal disc drive operation. However, since the STW operation is carried out on the HDA 101 before the PWA is mounted thereto, the control circuit 178 preferably includes this circuitry so as to emulate functional aspects of this circuit. Although the STW 170 of FIG. 4 utilizes a pusher pin assembly 172 to mechanically advance the actuator assembly 110, the STW 170 can be readily provided with an alternative configuration wherein the control circuit 178 utilizes circuitry such as set forth by FIG. 5 to apply current to the actuator coil 113 to sequentially advance the actuator assembly 110.

As set forth by FIG. 5, servo data are transduced from a selected disc surface and, after preamplification by the preamp/driver circuit 130 (previously shown in FIG. 1 and herein also referred to as the "preamp"), the servo data are passed to a demodulator circuit (demod) 184 which conditions the servo data for presentation to a digital signal processor (DSP) 186. During servo circuit position control operations, the DSP 186 operates in accordance with programming stored in DSP memory 188 to output current command signals to a coil driver 190, which in turn applies current to the coil 113 to position the head 120 as desired.

Figure 6:
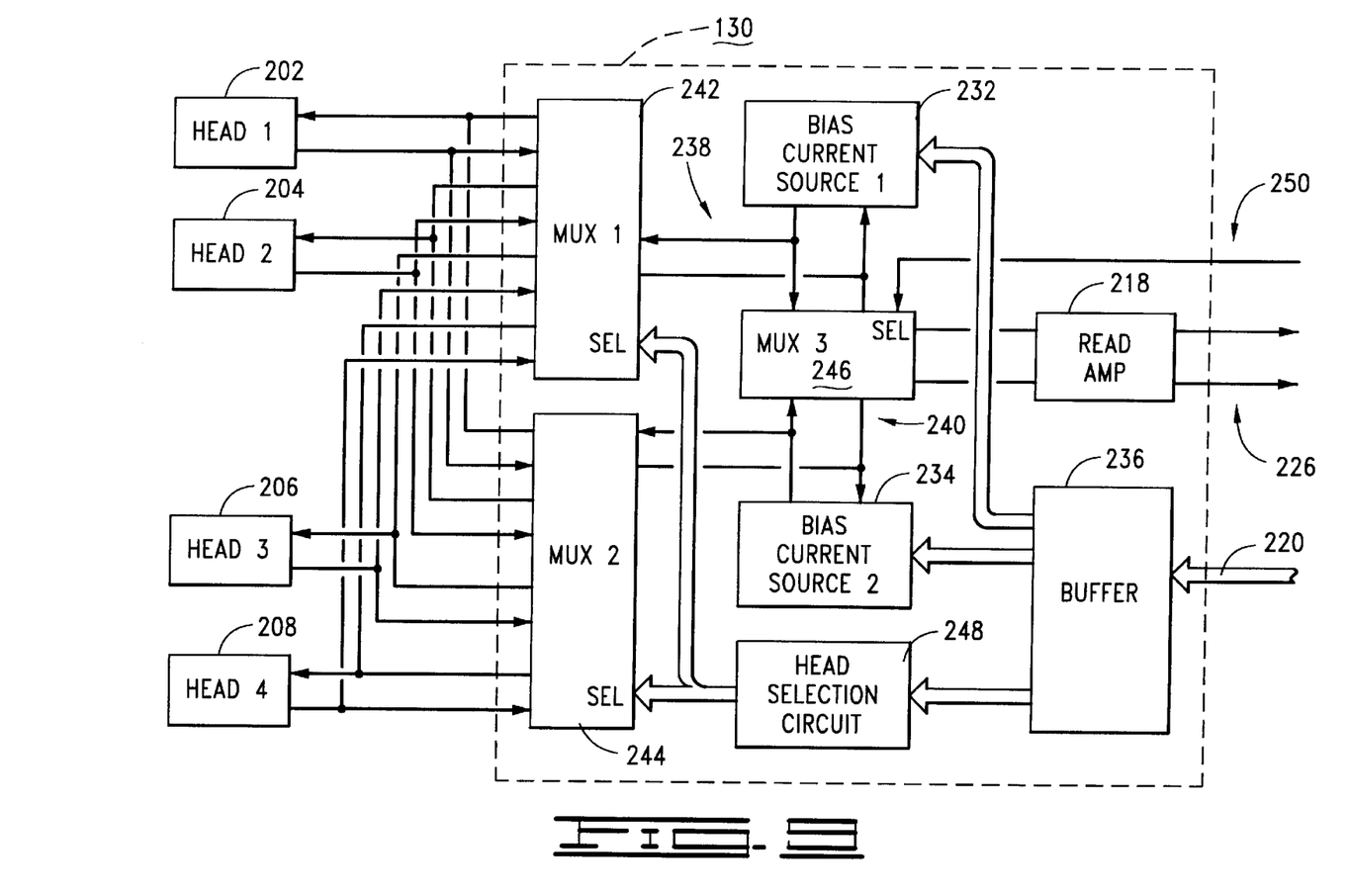
FIG. 6 is an elevational view of a disc stack of the HDA, generally illustrating the manner in which servo data are sequentially ordered on successive disc surfaces.

Additionally, the DSP 186 communicates with the preamp 130 to select the desired head 120 as well as to select the desired bias current for the head. FIG. 6 shows a schematic representation of a selected head 120, generally illustrating the presence of both a write element 192 and a read element 194. As will be understood, the write element 192 is used to write data to the discs 106 and preferably comprises a thin film inductive element with a conductor wrapped multiple times around a horseshoe shaped core with an air gap brought into proximity to the disc surface. As pulsed write currents are passed through the conductor, magnetic fringing occurs across the gap, selectively magnetizing the disc surface.

The read element 194 preferably comprises an MR element formed from an alloy of cobalt, nickel and iron and possesses a nominal direct current (dc) electrical resistance (such as 40 ohms). When the MR element is subjected to a magnetic field of selected orientation, the element undergoes a change in the baseline electrical resistance. Hence, data are read from a disc surface by passing a bias current through the MR element and monitoring changes in voltage thereacross induced by the magnetization of the disc surface. This produces the readback signal which can then be decoded by read/write circuitry to reproduce the originally stored data. The bias current is applied by the preamp 130 and has a magnitude selected by the DSP 186.

It will be recognized that all of the heads 120 have the same nominal construction as shown in FIG. 6. Although MR head technology has been presented herein in accordance with preferred embodiments, it will be further recognized that the present invention, as claimed below, is not necessarily limited to such construction, but can readily be used with other, similar technologies wherein bias currents are applied to read elements to transduce magnetic data, such as giant magneto-resistive (GMR) and spin-valve technologies.

Figure 7:
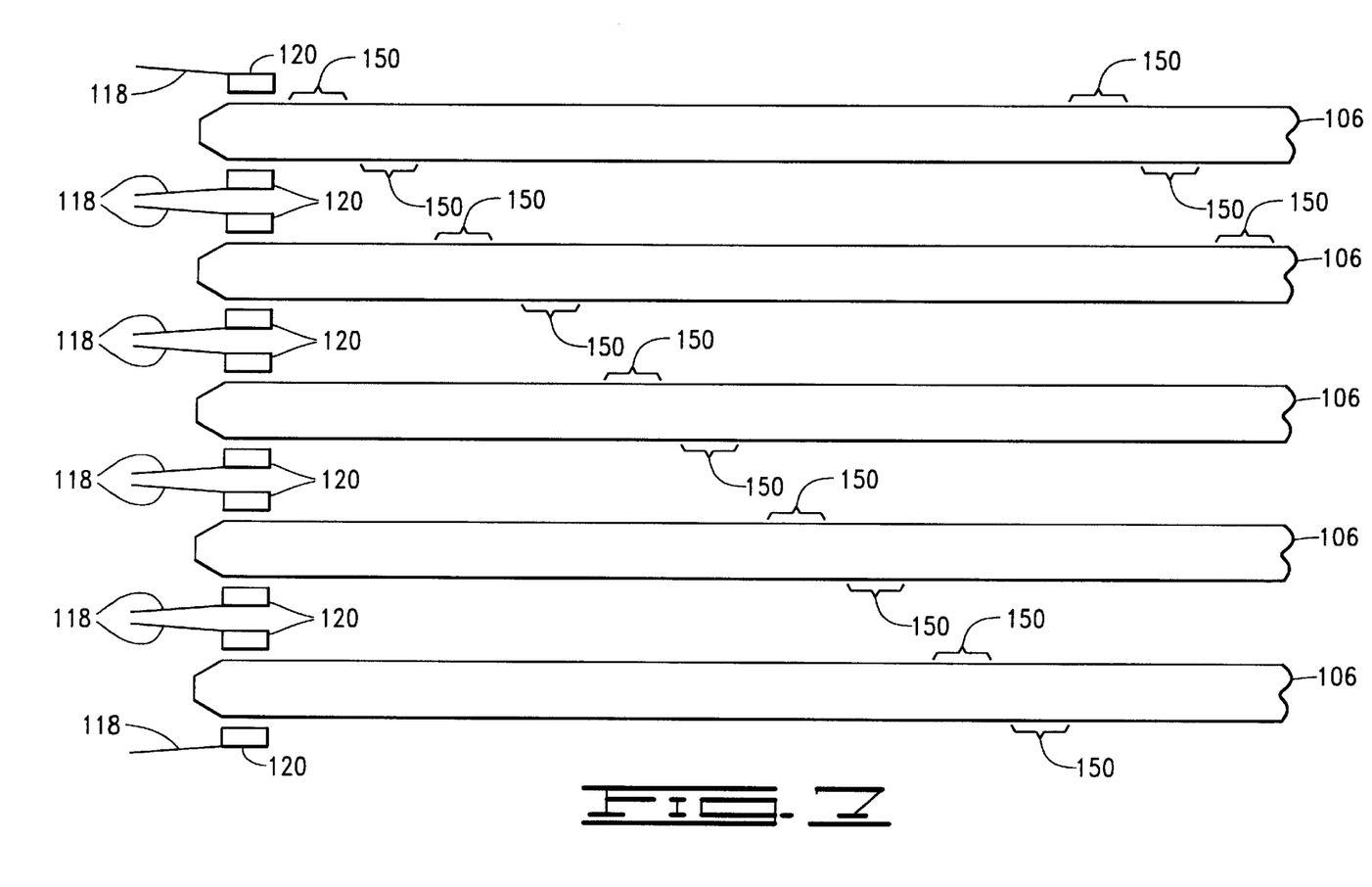
FIG. 7 shows a basic construction of one of the MR heads of the HDA.

FIG. 7 shows the generally stair-step manner in which servo data are written to successive disc recording surfaces. Particularly, FIG. 7 is an elevational representation of a plurality of discs 106 of the HDA 101 and corresponding heads 120 which are supported adjacent the surfaces of the discs 106 by flexure assemblies 118, as discussed above in FIG. 1. The servo wedges 150 (FIG. 2) are angularly displaced as shown so that, as discussed above, the heads 120 are cycled to write the servo data at different angular locations while being maintained at the same radial location with respect to the discs 106.

FIG. 8 shows a generalized functional block diagram of relevant portions of a prior art preamplifier/driver circuit ("preamp") 200 which is operably coupled to a total of four read/write heads 202, 204, 206 and 208. The heads 202, 204, 206 and 208 are nominally identical to the heads 120 discussed above, each thereby possessing an MR construction. It will be understood that the use of four heads is merely for purposes of illustration, in that prior art preamps such as 200 are commercially available to service a wide variety in the number of heads (such as up to 20 heads). Moreover, it will be understood that the preamp 200 further includes circuitry used to apply write currents to the write elements 192 (FIG. 6) of the heads, but such has been omitted for clarity.

The functional blocks of the prior art preamp 200 set forth in FIG. 8 include a buffer 210, a bias current source 212, a head selection circuit 214, switching circuitry represented as a multiplexer (mux) 216, and a read amplifier (amp) 218. During operation, a multi-bit input word is supplied to the buffer 210 which indicates, among other things, a desired head to be selected and a desired magnitude of bias current to be applied thereto. This input word is input along path 220 and can be supplied, for example, by a DSP such as illustrated at 186 in FIG. 5.

In response to the input word, the bias current source 212 selects and outputs the appropriate read bias current along path 222 to the mux 216. At generally the same time, the head selection circuit 214 uses the input word to select (via path 224) the desired head from the population of heads 202, 204, 206 and 208 (for example, the top head 202). In this manner, the bias current source 212, head selection circuit 214 and mux 216 cooperate to pass the desired magnitude of read bias current through the MR element of the selected head 202. As the head 202 transduces the selective magnetization of the corresponding disc surface, variations in the voltage across the MR element of the head 202 are sensed and amplified by the read amp 218 to output an amplified read signal on path 226. The amplified read signal is thereafter decoded to reconstruct the previously stored data.

While operable, the prior art preamp 200 of FIG. 8 presents limitations in the ability to transduce data from multiple heads. For example, switching from the first head 202 to the second head 204 requires the input of a new input word to the buffer 210, the decoding of this word by the bias current source 212 and the head selection circuit 214, the adjustment of the magnitude of the bias current to the new level and application of the new bias current magnitude to the second head 204, and the thermal stabilization of the second head 204. The foregoing actions are necessary before data can be transduced using the second head 204. Thus, these and other considerations limit the speed at which data can be transduced from successively selected disc surfaces. In the context of a STW operation, the rotational speed of the discs 106 may need to be slowed, or the servo wedges 150 spaced sufficiently apart on successive surfaces, to allow these actions to be carried out without requiring multiple revolutions of the discs 106.

Accordingly, FIG. 9 provides a functional block diagram of relevant portions of the preamp 130, constructed in accordance with preferred embodiments of the present invention. For ease of illustration, the preamp 130 is contemplated as being connected to the four heads 202, 204, 206 and 208 discussed in FIG. 8. It will be understood, however, that the present invention as claimed below is not limited to the particular configuration shown in FIG. 9.

As with the prior art preamp 200 of FIG. 8, the preamp 130 of FIG. 9 generally includes functional blocks that carry out bias current generation, head selection, switching and read signal amplification. Significantly, however, the preamp 130 includes multiple read bias current sources (identified at 232 and 234, respectively), each of which independently and simultaneously outputs a bias current of a selected magnitude.

Generally, during operation a multi-bit word is provided to a buffer 236, indicative of not only the presently desired head to be selected (such as the first head 202) and the associated magnitude of bias current to be applied thereto, but also of the next head to be successively selected (such as the second head 204) and the associated magnitude of bias current for the next head. In response to the input word, the bias current sources 232, 234 each select and output the respective magnitudes of bias current on paths 238, 240 respectively, to first, second and third multiplexers (muxs) 242, 244 and 246, as shown. It will be noted that the first and second muxs 242 and 244 are each connected to each of the heads 202, 204, 206 and 208. Although these interconnections are shown to be outside the dotted line box representing the preamp 130, it will be understood that these interconnections are contemplated as being formed within the preamp 130 so that only two conductors are preferably extended from the preamp 130 to each MR read element of the heads 202, 204, 206 and 208.

A head selection circuit 248 is operably coupled to the buffer 236 and the first and second muxs 242, 244 to channel the first and second bias currents (from the first and second bias current sources 232, 234) to the appropriate heads; in this example the first and second heads 202 and 204, respectively. Thus, the preamp 130 advantageously operates to simultaneously apply read bias currents to multiple heads. However, as the data transduced from the discs 106 is output serially (i.e., one disc at a time), the third mux 246 switches between the first and second heads 202, 204 by a selection input on path 250 to connect the appropriate readback signal to the read amp 218. This results in the generation of an amplified readback signal on path 226, as before. The selection input on path 250 can be provided, for example, by a sequencer (not shown) of the read channel circuitry which outputs read gate signals indicative of times when data are expected to be received from the preamp 130.

In this way, with reference again to FIG. 7, while the servo data are verified on the top surface of the top recording disc 106, the appropriate read bias current is simultaneously applied to the next head so that, when the servo data on the bottom surface of the top recording disc 106 reaches the next head, the next head is ready to transduce this next servo data. This operation continues to each successive head in turn, allowing efficient read verification of the servo data. It will be noted that the preamp 130 is particularly suited for operation during servo write verification, since the selection of heads occurs in accordance with a predetermined order.

Hence, with reference again to FIG. 9, it will be noted that in one preferred embodiment, the buffer 220 receives successive input words which allow the head selection circuit 248 and the bias current sources 232, 234 to sequentially apply the desired bias currents to the desired heads in the desired order. In another preferred embodiment, the preamp 130 is configured to operate in a special STW mode (set by a particular bit in the input word on path 220), which instructs the preamp 130 to automatically cycle among a series of predetermined head/bias current combinations suitable for a particular STW operation.

Figure 10:
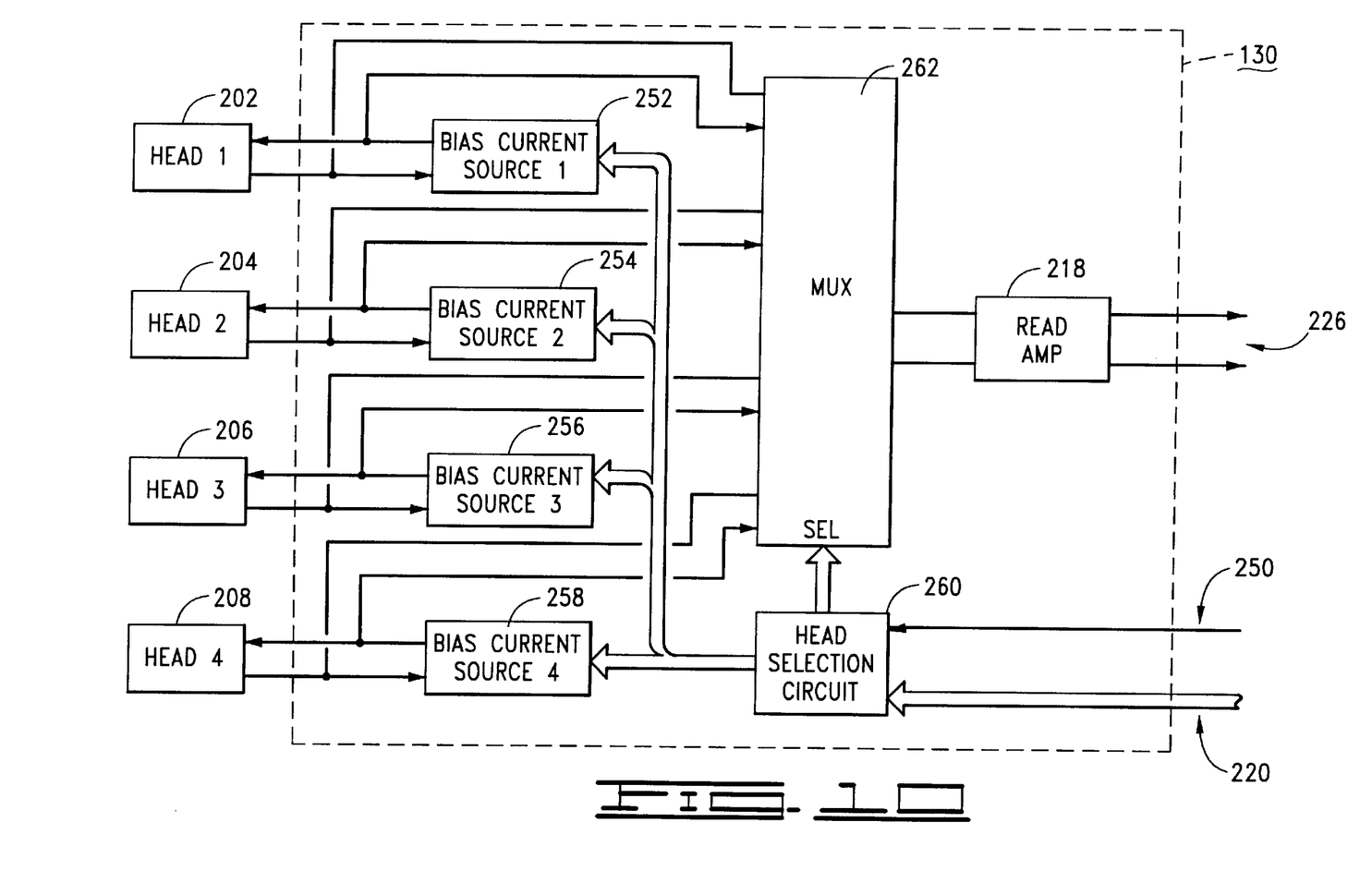
FIG. 10 provides a representation of an alternative construction for the preamplifier/driver circuit of FIG. 9 in accordance with preferred embodiments of the present invention.

FIG. 10 provides an alternative preferred construction for the preamp 130, similar to that set forth by FIG. 9 except that each of the heads 202, 204, 206 and 208 is provided with a separate bias current source (identified at 252, 254, 256 and 258, respectively). Again, only four heads have been shown in FIG. 10 for purposes of illustration, but the claimed invention is not so limited.

A head selection circuit 260 operates to selectively direct bias currents of selected magnitude from the bias current sources 252, 254, 256 and 258 to the heads 202, 204, 206 and 208, respectively. The voltages across the heads 202, 204, 206 and 208 are presented to a suitable switching network, such as a multiplexer 262, to sequentially apply these voltages to the read amp 218. Although it is contemplated that all of the bias current sources 252, 254, 256 and 258 could be simultaneously applied to the heads 202, 204, 206 and 208, such operation could undesirably increase the power requirements (and hence, the heat dissipation) of the preamp 130.

Hence, the head selection circuit 260 preferably operates to direct bias currents to only two heads at a time: the head that is presently being used to transduce data and the next head in line to transduce data. Once each head in turn has finished reading a particular servo data field 152 (FIG. 3), that head is deselected in favor of the next head in line. For example, the head selection circuit 260 operates to apply read bias currents to the first and second heads 202 and 204; after the data are transduced by the first head 202, the preamp 130 proceeds to transduce the data by the second head 204 while applying read bias current to the third head 206, and so on. As before, it is contemplated that the head selection circuit 260 can operate in response to input words on path 220, or can be configured to operate in a special STW mode to enable automatic cycling of the heads in a predetermined order. Selection inputs on path 250 can be used to indicate times when data are expected to be received from the preamp 130.

Figure 11:
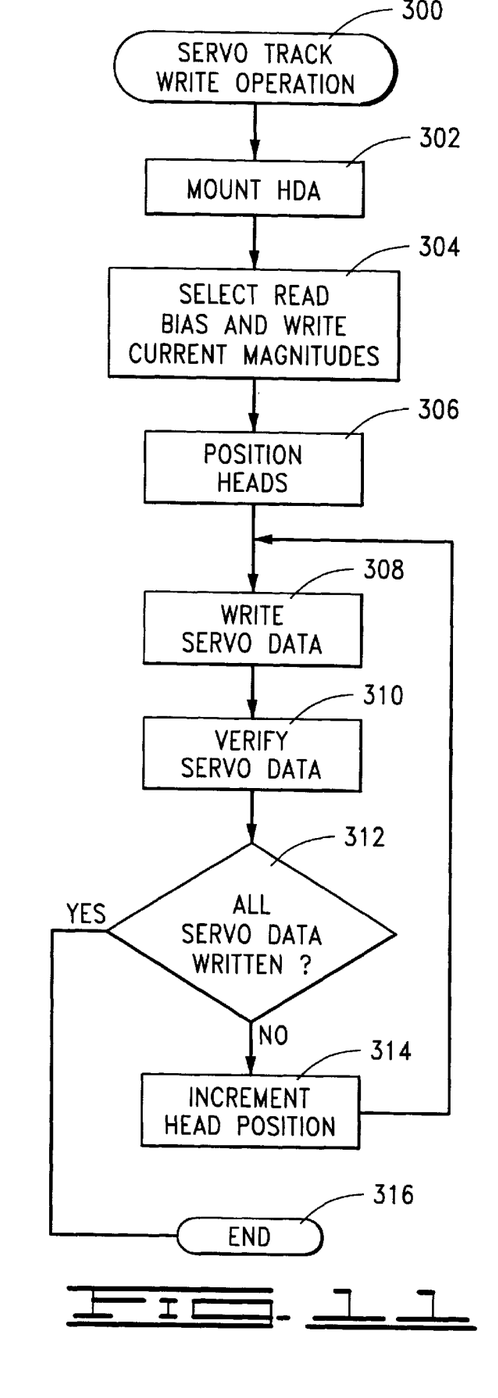
FIG. 11 is a flow chart illustrating a SERVO TRACK WRITE OPERATION routine, generally indicative of steps preferably carried out by the servo track writer of FIG. 4 in accordance with preferred embodiments of the present invention.
Figure 12:
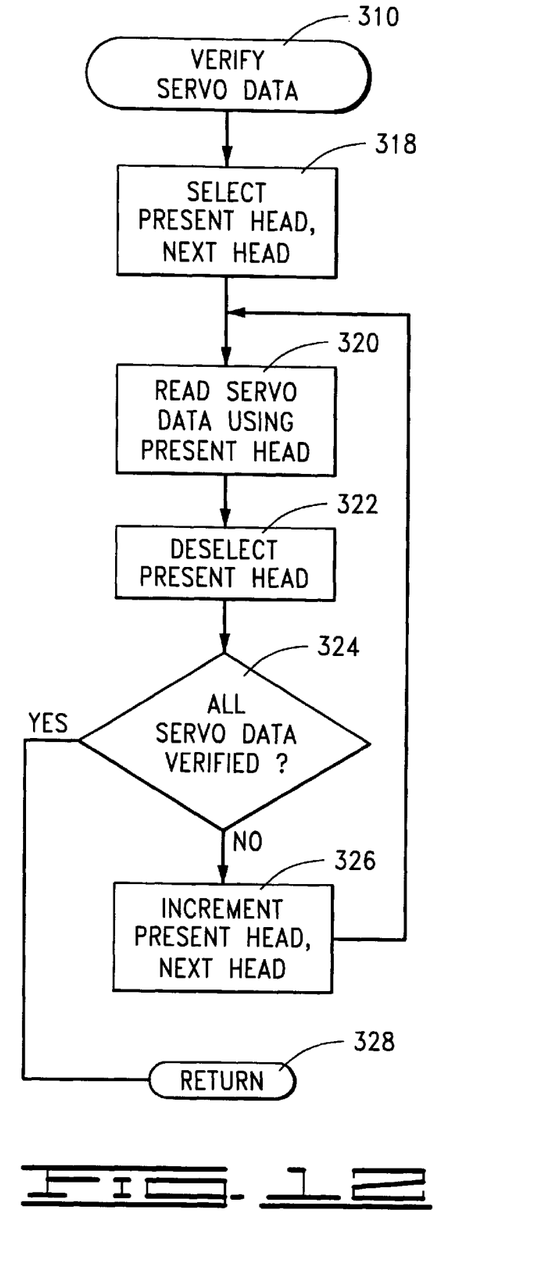
FIG. 12 is a flow chart illustrating a VERIFY SERVO DATA subroutine preferably carried out as part of the routine of FIG. 11 in accordance with preferred embodiments of the present invention.

FIGS. 11 and 12 summarize preferred operation of the preamp configurations of FIGS. 9 and 10 during STW operations. As discussed above, the preamp configurations of FIGS. 9 and 10 are particularly suited to servo track write verification operations, since the order in which the heads are to be successively selected are predetermined in relation to the arrangement of the servo data on the disc surfaces. It will be appreciated, however, that to the extent that it is known which head is to be selected next during normal disc drive operations, the preamp configurations of FIGS. 9 and 10 can be also used in a similar fashion to improve data transfer performance.

Beginning with FIG. 11, shown therein is generalized flow chart for a SERVO TRACK WRITE OPERATION routine 300, generally indicative of steps carried out by the STW 170 of FIG. 4 in accordance with preferred embodiments.

At step 302, the HDA 101 is first mounted to the mounting fixture 172 (FIG. 4) and necessary preparations are made to write the desired servo data to the HDA 101. Such preparations can include the insertion of a clock head (not shown) into the base deck 102 in order to write a clock track to an outer radius of a selected disc 106 in order to provide timing information during the STW operation.

Next, appropriate magnitudes of read bias and write currents are selected at step 304. As will be recognized, although MR heads are nominally identical, each will generally provide optimal performance at slightly different magnitudes of read bias and write currents. Thus conventional operations can be first carried out to select appropriate current magnitudes for each of the heads; alternatively, based on historical data, it may be determined that the servo data can be adequately written to and transduced from each of the disc surfaces using the same magnitudes of currents for each head.

At step 306, the STW 170 proceeds to position the actuator assembly 110 to the desired location so that the heads are ready to commence writing, which occurs at step 308. More particularly, the STW 170 (FIG. 4) operates to write the desired servo data to a selected radial location on the discs 106, cycling through each of the disc surfaces as illustrated in FIG. 7. Although STW operations can vary, it is common to write the servo data in multiple increments for each track (such as in one-half track increments) so that multiple passes are made to complete all the servo fields 152 (FIG. 3) in a given cylinder (i.e., all tracks on all the discs 106 at a given radius). Hence, in a preferred embodiment one complete cylinder of servo fields 152 are written during the step 308 before readback verification takes place.

The servo data are next verified at step 310, which is set forth more fully by the flow of FIG. 12, discussed below.

Once the verification step is completed, decision step 312 determines whether all of the servo data have been written to the discs 106; if not, the routine continues to step 314 wherein the head position is incremented to prepare the heads to write the next cylinder of servo data, and the routine returns to step 308. Once all of the servo data have been written to the discs, the routine passes from the decision step 312 to end at step 316.

FIG. 12 provides a flow chart for a VERIFY SERVO DATA subroutine, preferably constituting steps carried out by the step 310 of FIG. 11.

At step 318, the routine operates to select a pair of heads identified as the "present head" and the "next head," with the present head comprising the head from which servo data are to be transduced and the next head comprising the next head in line for use in transducing servo data. In accordance with the foregoing examples of FIGS. 9 and 10, the present head would initially be the first head 202 and the next head would initially be the second head 204. During step 318, the appropriate bias currents are simultaneously applied to the present head and the next head, in that the next head receives read bias current while the present head receives read bias current.

Next, the present head is used to transduce the servo data on the corresponding disc surface, as indicated by step 320. As before, a readback signal is generated as the servo data pass under the present head, with this readback signal being amplified by the read amp 218 and output on path 226. During the operation of step 320, any servo data fields 152 having errors are logged for subsequent rereading and, if such persist, appropriate corrective actions. Once the present head has completed reading the servo data, the present head is deselected at step 322. This entails the removal of the read bias current from the present head by the preamp 130.

Decision step 324 next determines whether all of the servo data at the selected position of the heads have been verified; if not, the present head and the next head are incremented at step 326. For example, if the heads are identified as $K_0$ through $K_n$ and the present head is initially set to head $K_0$ and the next head is initially set to $K_1$, then the operation of step 326 serves to adjust the present head to $K_1$ and the next head to $K_2$. The subroutine continues in like fashion until all of the servo data at the selected head location (such as the selected cylinder) have been verified. For example, if there are 90 servo wedges 150 (FIG. 2) on each disc surface, then the subroutine 310 will cycle back through 90 times to read verify each of the associated servo data fields 152. It is contemplated that this operation can be readily carried out during one revolution of the discs 106. Once all of the servo data have been verified, the routine returns at step 328.

In view of the foregoing, it will be recognized that the present invention is directed to an apparatus and method for simultaneously biasing multiple magneto-resistive read elements in a head/disc assembly (HDA) of a disc drive.

In accordance with preferred embodiments, an HDA 101 includes a preamplifier circuit 130 having a first read bias current source 232, 252 which generates a first read bias current of selected magnitude and a second read bias current source 234, 254 which generates a second read bias current of selected magnitude independently of the first read bias current. A head selection circuit 248, 260 selects first and second heads 202, 204 of the HDA disc drive so that the first and second read bias currents are simultaneously directed to the first and second heads, respectively.

For purposes of the appended claims, the phrase "disc drive" will be understood consistent with the foregoing discussion to describe a data storage device of the type used to store computerized data, such as 100. The phrase "head/disc assembly," as denoted above by reference numeral 101, will be understood to describe a mechanical assembly of a disc drive housing one or more rotatable discs 106 and an actuator assembly 110 which supports a plurality of heads 120, 202, 204, 206, 208 adjacent the discs 106. The term "magneto-resistive" will be understood to cover head construction technologies which utilize read bias currents to transduce magnetically stored data.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method for performing a read operation in a head/disc assembly of a disc drive, comprising steps of:
    (a) providing first and second read bias current sources and a read preamplifier sequentially connectable to the first and second read bias current sources;
    (b) applying a first read bias current from the first read bias current source to a first head of the head/disc assembly to transduce data from a corresponding first disc recording surface;
    (c) during the operation of step (b), applying a second read bias current from the second read bias current source to a second head of the head/disc assembly adjacent a corresponding second disc recording surface to thermally stabilize the second head to prepare the second head for the subsequent transducing of data from the second disc recording surface; and
    (d) during the operation of steps (b) and (c), connecting the first read bias current source to the read preamplifier without connecting the second read bias current source to the read preamplifier, the read preamplifier amplifying a first readback signal generated as the data are transduced from the first disc recording surface.

2. The method of claim 1, further comprising steps of:
    (e) disconnecting the first read bias current source from the read preamplifier; and
    (f) connecting the second read bias current source to the read preamplifier to amplify a second readback signal generated as the data are transduced from the second disc recording surface.

3. The method of claim 1, wherein the read operation comprises a write verification operation and the data comprises servo data.

4. A head/disc assembly of a disc drive, comprising:
    a plurality of rotatable disc recording surfaces on which data are stored;
    a plurality of heads adjacent the disc recording surfaces, wherein each head is provided with a read element to transduce the data from a corresponding disc recording surface as a read bias current is applied to the read element, the plurality of heads including at least first and second heads adjacent first and second disc recording surfaces of the plurality of rotatable disc recording surfaces; and
    a preamplifier circuit, comprising:
        first and second read bias current sources which respectively generate first and second read bias currents;

a read preamplifier selectively connectable to the first and second read bias sources; and a head selection circuit which connects the first read bias current source to the first head and the read preamplifier so that the read preamplifier amplifies a first readback signal generated in relation to the data transduced from the first disc surface, and further connects the second read bias current source to the second head without connecting the second head to the read preamplifier.

5. The head/disc assembly of claim 4, wherein the head selection circuit subsequently disconnects the first read bias current source from the read preamplifier and connects the second read bias current source to the read preamplifier to amplify a second readback signal generated as the data are transduced from the second disc recording surface.

6. The head/disc assembly of claim 4, wherein the plurality of heads further includes at least a third head adjacent a third disc recording surface of the plurality of rotatable disc recording surfaces, wherein the preamplifier circuit further comprises a third read bias current source which generates a third read bias current, and wherein the head selection circuit subsequently applies the third read bias current to the third head while the second read bias current remains directed to the second head and the read preamplifier to thermally stabilize the third head to prepare for subsequent transducing of data using the third head.

7. A disc drive, comprising:

first and second disc surfaces which are axially aligned for rotation about a common rotational axis;

first and second heads controllably positionable adjacent the respective first and second disc surfaces and each comprising a read element which detects selective magnetization of the respective disc surface in response to application of a read bias current through the read element; and a preamplifier circuit, operably coupled to the first and second heads, which simultaneously applies first and second read bias currents to the first and second heads, respectively to transduce data from the first disc surface using the first head and thermally stabilize the second head before using the second read bias current to transduce data from the second disc surface, the preamplifier circuit comprising:

a first read bias current source which generates the first read bias current having a first selected magnitude;

a second read bias current source which generates a second read bias current having a second selected magnitude different from the first selected magnitude;

a read preamplifier circuit coupled to the first and second read bias sources; and a head selection circuit, operably coupled to the first and second heads, which in response to a head selection command to transduce data from the first head connects the first read bias current source to the first head and the read preamplifier circuit so that the read preamplifier circuit amplifies a first readback signal generated in relation to the selective magnetization of the first disc surface, and farther connects the second read bias current source to the second head without connecting the second head to the read preamplifier circuit.

8. The disc drive of claim 7, wherein the disc drive further comprises a third disc surface axially aligned for rotation about the common rotational axis and a corresponding third head adjacent the third disc surface, wherein in response to a subsequent head selection command to transduce data from the second head the head selection circuit further connects the second read bias current source to the second head and the read preamplifier circuit so that the read preamplifier circuit amplifies a second readback signal generated in relation to the selective magnetization of the second disc surface, and flirter connects the second read bias current source to the third head without connecting the third head to the read preamplifier circuit to thermally stabilize the third head before subsequently transducing data from the third disc surface.

9. The disc drive of claim 8, further comprising a servo circuit which operates to control the position of the first, second and third heads, wherein the data sequentially transduced from each of the first, second and third disc surfaces comprises servo data used by the servo circuit to determine the position of the respective first, second and third heads.

* * * * *